United States Patent [19]
Jourde

[11] Patent Number: 5,836,500
[45] Date of Patent: Nov. 17, 1998

[54] GUIDING DEVICE USING A NON-BENDING SEGMENTED ROTARY ROLL

[75] Inventor: Bernard Jourde, Elbeuf, France

[73] Assignee: Asselin, Elbeuf, France

[21] Appl. No.: 805,629

[22] Filed: Feb. 26, 1997

[30] Foreign Application Priority Data

Feb. 27, 1996 [FR] France .................................. 96 02378

[51] Int. Cl.⁶ .......................... B65H 20/00; B65H 57/14; F16C 13/00
[52] U.S. Cl. ...................... 226/189; 226/194; 242/615.2; 384/543; 384/546
[58] Field of Search ..................................... 226/189, 194, 226/168; 242/615.2; 384/546, 543

[56] References Cited

U.S. PATENT DOCUMENTS

| | | | |
|---|---|---|---|
| 2,745,663 | 5/1956 | Hamilton et al. | 226/194 X |
| 3,679,115 | 7/1972 | Stock | 226/194 X |
| 3,786,975 | 1/1974 | Heymanns | 226/194 |
| 4,010,528 | 3/1977 | Böhmer . | |
| 4,239,142 | 12/1980 | Schönmeier et al. . | |
| 4,472,155 | 9/1984 | Greding . | |
| 4,669,646 | 6/1987 | Oinonen | 242/615.2 X |

FOREIGN PATENT DOCUMENTS

| | | |
|---|---|---|
| 2454902 | 6/1976 | Germany . |
| 2843204 | 2/1980 | Germany . |
| 2912990 | 10/1980 | Germany . |
| 9308110 | 4/1993 | WIPO . |

*Primary Examiner*—Michael Mansen
*Attorney, Agent, or Firm*—Greer, Burns & Crain, Ltd.

[57] ABSTRACT

An apparatus is provided for accurately guiding and treating textile strips of great width using a quasi-continuous roll which does not bend. The roll is used for guiding material presented in strip form, in particular a textile material which is in contact with a peripheral portion of the roll. The roll is sub-divided into tubular segments attached to one another by flanges supported by an inner ring of a ball bearing. An outer ring of the ball bearing is fixed in a collar integral with a support. In an angular region other than the one which is in contact with the material, the support, made from thin and flat sheet steel, extends radially outwardly to a region of attachment to the frame.

18 Claims, 3 Drawing Sheets

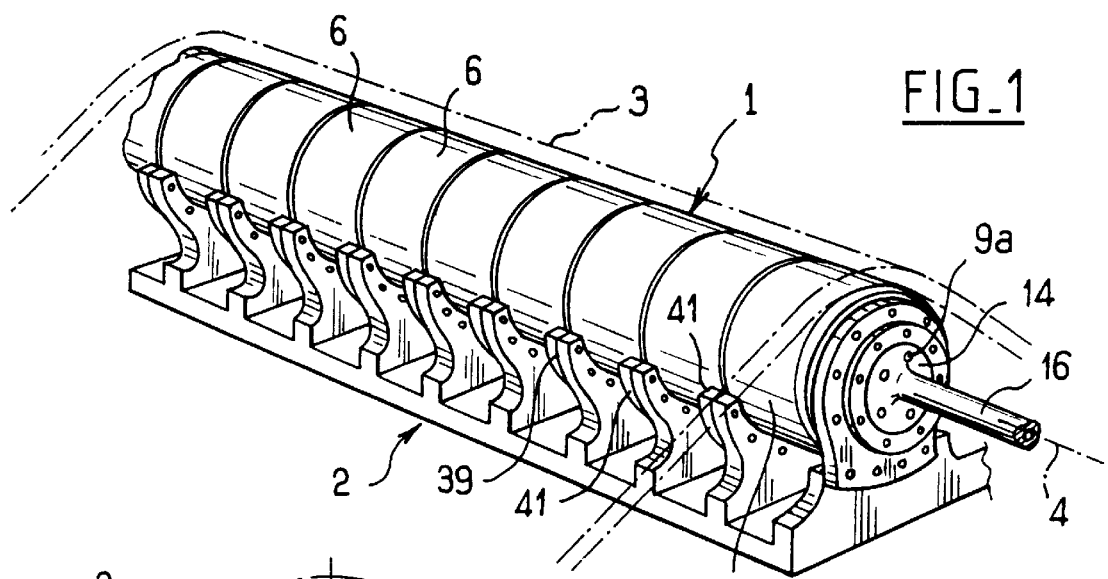
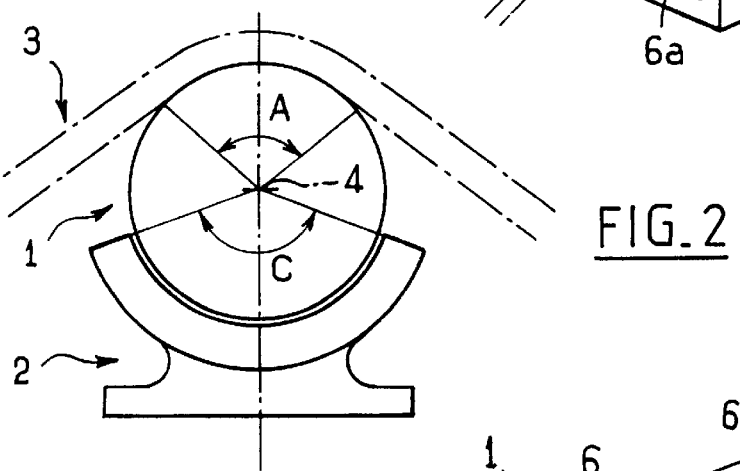
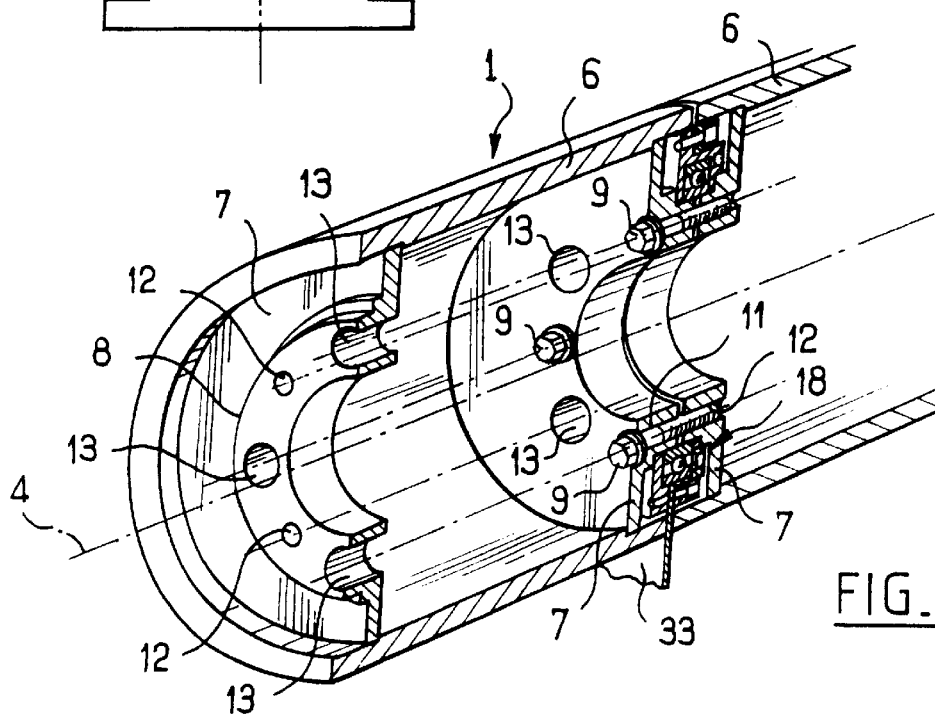

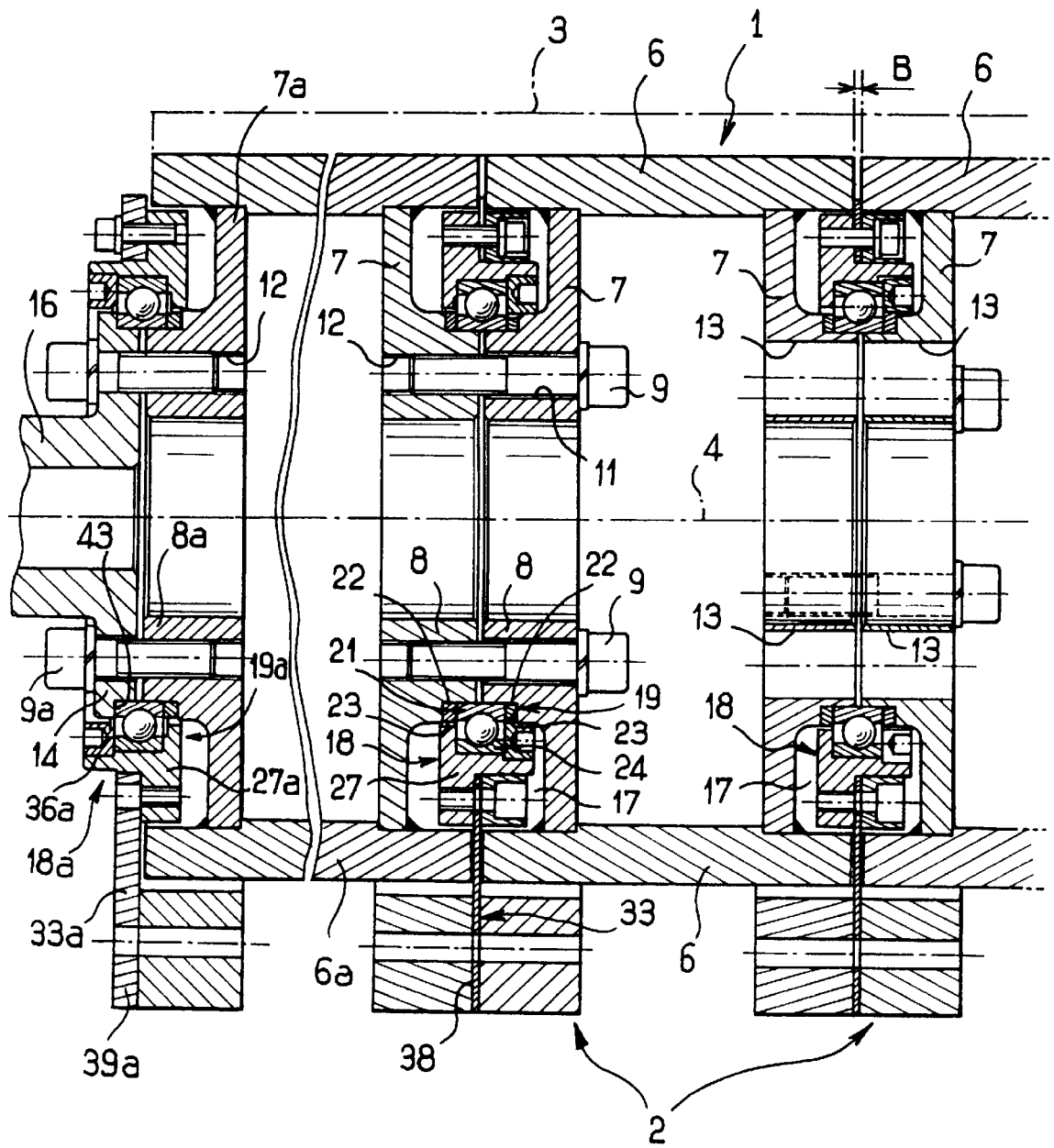
FIG_3

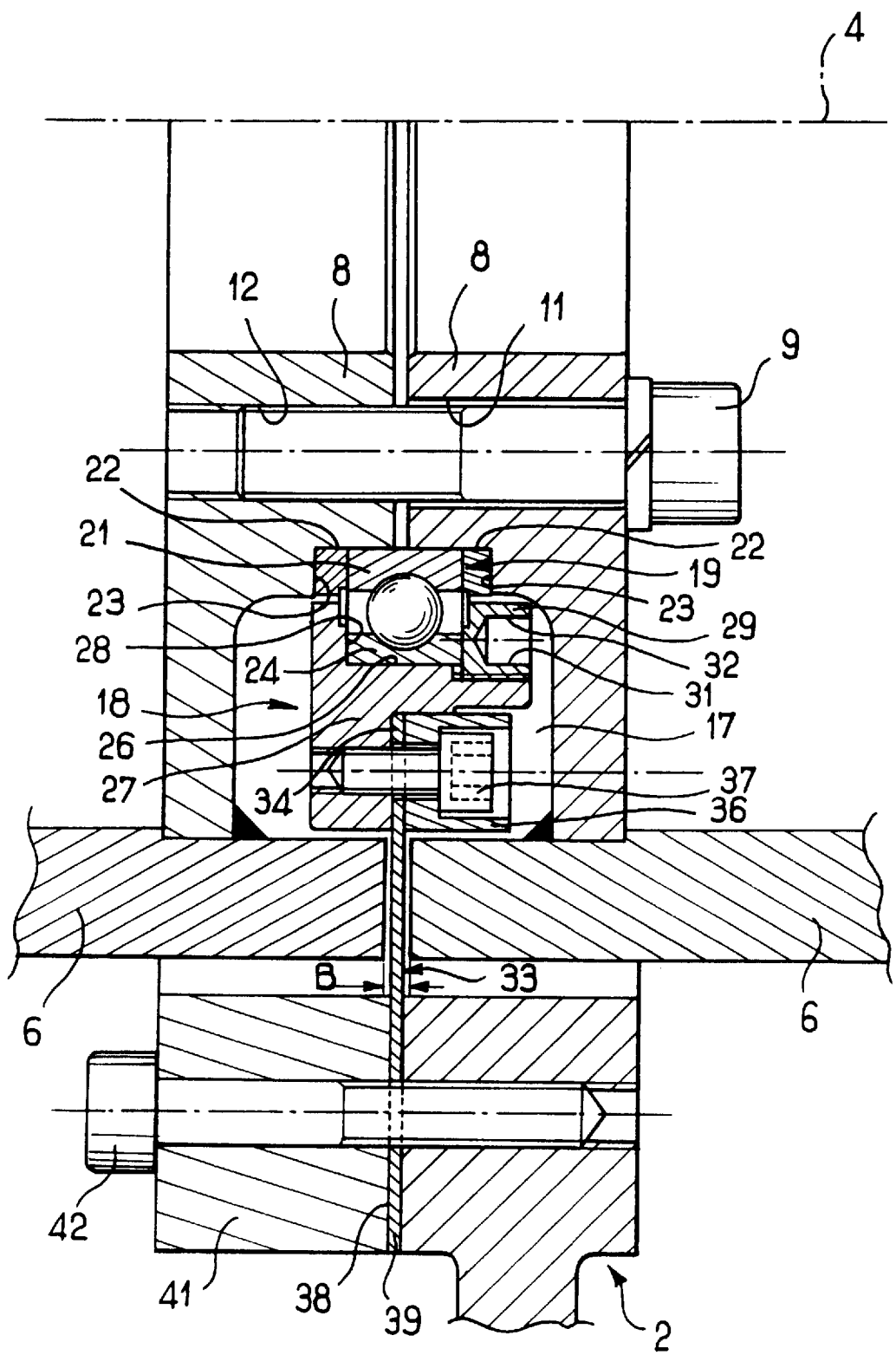
FIG_5

5,836,500

GUIDING DEVICE USING A NON-BENDING SEGMENTED ROTARY ROLL

BACKGROUND OF THE INVENTION

The present invention relates to a guiding device using a rotary roll, intended in particular to provide accurate guidance to materials presented in very wide strip form, in particular textile webs or fleeces. In addition to the guidance function, the roll can have a driving or braking function or it can have an outer surface configured in a special way, for example with teeth or lamellae, in order to apply a specific treatment to the material passing through the guiding device.

The guidance of such materials, whose width can be as much as several meters, and sometimes more than ten meters, raises problems because the guidance rolls can flex or vibrate. This movement of the guidance rolls is harmful to the quality of the industrial process to which the material is subjected.

Guidance devices using segmented rolls are known in the prior art.

German Pat. No. 2,912,990 (VOITH) relates to a strip separator roll formed of successive elementary rolls. The elementary rolls are mounted to be rotatable about a common support. The elementary rolls are independent from one another, both axially and angularly.

U.S. Pat. No. 4,472,155 (GREDING) relates to an assembly of cylinders for winding reels of paper, formed by at least two axially aligned cylinders. The coupling between two successive cylinders is achieved by means of a deformable element interposed between the adjacent ends of two cylinders, allowing the transmission of torsion forces between the two cylinders. As the elastic element is deformable by nature, the axial alignment of the cylinders is not optimized, nor is it even sought.

These known devices necessitate a large axial gap between the successive segments.

The purpose of the present invention is to provide a guiding device using a rotary roll, allowing excellent straightness of the roll even if the roll's length is very great, and having a very small axial gap between the peripheral surfaces of the successive segments.

SUMMARY OF THE INVENTION

According to the invention, the rotary roll guiding device uses a rotary roll, comprising a roll supported in rotation with respect to a frame by means of bearings and whose outer surface is intended to support a material, in particular a textile strip, in a first angular region about the axis of the roll, the roll being subdivided into successive coaxial tubular segments having an axial gap between their peripheral surfaces. The roll segments have at their axial ends internal flanges by which they are attached to one another, and the bearings comprise, at at least one junction between two adjacent segments, an intermediate bearing radially housed inside the tubular segments, having an inner ring supported by at least one of the two internal flanges. Here the two adjacent segments are attached to one another, and an outer ring is supported, at least indirectly, by a thin support extended radially outwardly to a fixing device and passing through said axial gap in a second angular region about the axis of the roll.

The axial gap between the successive tubular segments can be extremely small, just sufficient to allow the passage of the support between its region radially inside the segments, which support the outer ring of the bearing, and its radially outer region by which it is attached to the frame of the device. The support can be very thin, for example flat and made from sheet steel. The bearing is formed inside the tubular segments and only the support extends radially outside in order to provide the connection with the frame.

The small axial gap which remains between two tubular segments has no effect on the quality of the guidance and/or of the treatment provided by the roll in comparison with that provided by a roll made in one piece. It is possible to give the segments the axial length which is considered appropriate according to the axial distance which is necessary between the successive bearings in order to provide the desired accuracy of guidance.

Other features and advantages of the invention will furthermore emerge from the following description relating to a non-limitative example.

BRIEF DESCRIPTION OF THE DRAWINGS

In the accompanying drawings:

FIG. 1 is a perspective view of a guidance device according to the invention;

FIG. 2 is a diagrammatic end view;

FIG. 3 is an axial, partial cross-sectional view of the device shown in FIGS. 1 and 2, at a larger scale;

FIG. 4 is a diagrammatic, cross-sectional, perspective view, showing the inside of the roll; and FIG. 5 is a detail of FIG. 3, at a larger scale.

DETAILED DESCRIPTION OF THE INVENTION

In the example shown in the figures, the guiding device comprises a rotary roll 1 supported in rotation with respect to a frame 2 which can be the frame of a textile machine and which is shown only partially.

The roll 1 is intended to guide, drive and/or process a material in strip form 3 which is represented in dotted and dashed line in FIGS. 1 to 3. As shown in FIG. 2, the material 3 is in contact with the roll 1 along a predetermined first angular region A about the axis 4 of the roll.

According to the invention, the roll 1 consists of identical and coaxial tubular segments 6 which succeed one another along the axis 4. There is an axial gap B (FIG. 3) between the two adjacent axial ends of each pair of adjacent segments 6.

Each segment 6 carries in each of its axial ends an internal flange 7 of generally annular shape which is welded to the inside periphery of the segment 6. The flanges 7 are axially thicker around their inside periphery in order to form a cylindrical end piece 8 oriented axially towards the outside of the segment 6 and therefore towards the flange 7 of the adjacent segment 6. The successive segments 6 are attached to one another by means of their adjacent internal flanges 7. In order to do this, screws 9, distributed around the axis 4 pass through smooth holes 11 in one of the flanges and are screwed into threaded holes 12 in the other flange. The holes 11 and 12 are formed parallel with the axis 4 through the cylindrical end pieces 8.

The internal flange 7 provided with threaded holes 12 comprises openings 13 between the latter. In each tubular segment 6, the smooth holes 11 provided on one of the internal flanges 7 are axially aligned with the openings 13 of the other flange 7. Because of this feature, the roll 1 can be assembled easily, segment by segment, starting from the left of FIG. 3. In order to do this, each new tubular segment 6 is positioned such that its flange equipped with smooth holes 11 is on the already-assembled side (the left hand side of FIG. 3). Each screw 9 can then be screwed in by means of a tool inserted from the right of FIG. 3, through the corresponding opening 13 of the other flange 7 of the tubular segment 6 in the process of being mounted.

In order to simplify manufacturing, the flanges 7 can all, as shown, be virtually identical, and in particular they can all have openings 13. The only difference between them being the presence either of smooth holes or of threaded holes. During assembly, the two flanges of each segment are angularly offset with respect to one another in order to align the smooth holes 11 with the openings 13 of the other flange.

In the example shown in FIG. 3, the tubular segment 6a at the end of the roll 1 is special in that its left flange 7a, and therefore the one adjacent to the end of the roll 1, also comprises threaded holes 12 instead of smooth holes. The flange 7a is assembled to an end flange 14 by means of screws 9a engaged axially from the outside of the roll 1. The end flange 14 is part of a shaft 16 connected for example to a driving source. Furthermore, the tubular segment 6a does not need to comprise openings 13.

At each junction between two successive tubular segments 6, or 6 and 6a, an annular housing 17 is defined around the axis 4 between the internal flanges 7 and radially between the end pieces 8 and the radially internal surface of the two segments 6. Each housing 17 receives a bearing 18 comprising a ball bearing 19 of which an inner ring 21 is fitted over the cylindrical outer surface of two end pieces 8. The ring 21 straddles the two end pieces 8 and thus ensures a mutual centering of the two flanges, and therefore of the two segments 6. The inner ring 21 is clamped between two shoulders 23 of the two internal flanges 7 by the intermediary of two shims 22, and under the clamping force provided by the screws 9. When the screws 9 are in the tightened state, there is a free axial gap between the two end pieces 8 so that the clamping force is applied on the shims 22.

The outer ring 24 of the bearing 19 is fitted into a counter-bore 26 of a collar 27. The outer ring 24 is held axially between a shoulder 28 terminating the counter-bore 26 and a stop washer 29 screwed in the entrance 31 of the counter-bore 26. The washer 29 has cavities 32 to provide grip to a tool for tightening the washer 29 in the entrance 31.

A flat support 33 made of sheet steel, comprises a radially internal region 34 located in the housing 17 and which is clamped by means of tightening screws 37 between a radially outer flange of the collar 27 and a counter-collar 36. The support 33 is made from very thin sheet steel whose thickness is preferably equal to a maximum of 3 mm.

In a second angular region C (FIG. 2) about the axis 4, which does not comprise any overlap with the first region A in which the roll 1 supports the material 3, the support 33 extends radially towards the outside through the gap B between the peripheral surfaces of the two segments 6, to a region 38 forming an attachment tab located radially outside of the roll 1. The tab 38 is fixed by tightening screws 42 between an arc-of-circle shaped plate 39 integral with the frame 2 and a shoe 41 of the same shape. The inner periphery of the plate 39 and of the shoe 41 is as close as possible, radially, to the outer peripheral surface of the roll 1 in order to reduce the possibilities of flexion of the support 33. For the same reason, the outer peripheral surfaces of the collar 27 and of the counter-collar 36 are as close as possible to the inner periphery of the segments 6. The axial dimension of the gap B is just sufficient to allow the passage of the support 33 with a reasonable clearance for the rotation of the segments 6 with respect to the fixed support 33. Preferably, the axial dimension of the gap B is between 2mm and 4mm, chosen according to the thickness of the support 33 such that the clearance is about 0.5 mm on each side of the support.

As shown in FIG. 3, the support 33 is engaged in the gap B even in the angular regions which do riot extend down to the attachment tab 38, and particularly in the region A. This makes the positioning of the support 33 more accurate in a plane perpendicular to the axis 4 and prevents any flexion of the support in the regions angularly distant from the attachment tab 38. Furthermore, in this way, the support forms a seal between the segments to prevent or hinder the penetration of textile fibres towards the bearings. However, in the region A and even in the angular regions other than A and C, the outer periphery of the support 33 is sufficiently close to the axis 4 not to risk interfering with the material 3 during operation.

In service, the roll 1 practically cannot bend because it is supported at regular axial intervals, chosen to be as short as is desired, by the intermediate bearings 18, whose radially outer rings 24 are fixedly positioned by the supports 33 by the intermediary of the collars 27 and the counter-collars 36.

As shown in FIG. 3, a bearing 18a can also be provided at the end of the roll 1, with a ball bearing 19a whose inner ring is fitted over the cylindrical end piece 8a of the flange 7a and over a cylindrical surface 43 of the flange 14. The outer collar of the ball bearing 19a is held between a collar 27a and a counter-ring 36a accessible from outside of the roll. However, the radially outer flange of the collar 27a is no longer attached to a thin support, but to a distinctly thicker support 33a of which a radially outer part is attached to a plate 39a of the frame 2.

Similarly, a bearing can be provided at the other end of the roll 1, but it is directly adaptable to a segment 6 whose left flange comprises smooth holes.

The invention is not of course limited to the example described and shown.

For example, it would be possible to make provision for the two flanges 7 at each junction to be attached to one another by the intermediary of a connecting and centring piece.

It would also be possible to make provision for the two flanges of a junction to comprise mutual centering means. It is possible for only one of the two flanges to comprise a centering surface for the inner ring of the bearing. Similarly, the fitting of the outer ring of the bearing is not limited to the method described. The support collar could be integral with the inner periphery of the support, for example by being welded to it.

I claim:

1. A guiding device using a rotary roll, comprising:
   a frame;
   a roll having an axis and two axial ends, and comprising an axial succession of at least two roll segments, each having two opposing axial ends and being rigidly connected to each other;
   an axial gap defined between said two opposing axial ends of said at least two successive segments, at least one of the opposing ends being tubular;
   an annular recess which is formed to extend within said at least one tubular opposing end and opens radially outwardly to be in communication with said axial gap, said recess having a cylindrical inner wall;
   a bearing having an inner ring mounted around said cylindrical inner wall of said recess, an outer ring and a support plate, said outer ring being supported, at least indirectly, by said frame by way of said support plate which extends radially outwardly through said gap; wherein said bearing is axially longer than said axial gap and projects axially into said tubular opposing end.

2. A guiding device according to claim 1, wherein the roll segments are tubular and have internal flanges in said opposing axial ends, and the flanges of the adjacent opposing axial ends of said at least two successive roll segments are rigidly attached to one another.

3. A guiding device according to claim 2, in which said flanges are attached to one another by means for fastening being distributed angularly about the axis of the roll.

4. A guiding device according to claim 3, wherein at least one of the roll segments has a said internal flange at each axial end thereof, each flange of said at least one roll segment has an opening in axial alignment with one of said means for fastening associated with the other flange of said at least one roll segment.

5. A guiding device according to claim 3, wherein the means for fastening comprise screws.

6. A guiding device according to claim 2, wherein each said internal flange has an outer face which is provided with a tubular end-piece forming a radially inner wall of said annular recess.

7. A guiding device according to claim 6, wherein two axially adjacent end-pieces of said adjacent ends of said two successive roll segments are directly secured to each other, thereby rigidly attaching said at least successive roll segments together.

8. A guiding device according to claim 7, wherein said internal flanges of said at least one roll segment are angularly offset with respect to one another about the axis of the roll.

9. A guiding device according to claim 2, wherein the internal flanges are ring-shaped.

10. A guiding device according to claim 2, wherein at least one of the two internal flanges rigidly attached to one another at a junction between said two successive roll segments forms a cylindrical end piece over which is fitted the inner ring of said bearing.

11. A guiding device according to claim 2, wherein each internal flange has a shoulder, and the inner ring of said bearing is axially positioned, at least indirectly, between the two shoulders of said two internal flanges rigidly attached to one another.

12. A guiding device according to claim 2, wherein the device comprises a shaft for the rotation of the roll, the shaft having a terminal flange, and wherein at least one of the ends of the roll, an internal flange which is part of an end segment of the roll is rigidly attached to said terminal flange of the shaft.

13. A guiding device according to claim 1, wherein said at least two successive roll segments each have an inner cylindrical end-piece facing towards the other of these at least two successive roll segments, and the inner ring of said bearing is simultaneously fitted over the two end pieces thus ensuring their mutual centering.

14. A guiding device according to claim 1, wherein a support collar which has a counter-bore having a terminal shoulder and receiving a stop washer which is fixed in said counter-bore is attached to the internal periphery of the support plate, and wherein the outer ring of said bearing is accommodated in the counter-bore of the collar, axially between the terminal shoulder and the stop washer of the counter-bore.

15. A guiding device according to claim 1, wherein the support plate is made of sheet steel.

16. A guiding device according to claim 1, wherein the support plate has, in said gap between said successive tubular segments, a maximum thickness of 3 mm.

17. A guiding device according to claim 16, wherein the axial gap between said at least two successive tubular segments in between 2 mm and 4 mm.

18. A guiding device according to claim 1, wherein the support plate includes annular portions located in said gap which do not extend to the frame.

* * * * *

UNITED STATES PATENT AND TRADEMARK OFFICE
CERTIFICATE OF CORRECTION

PATENT NO. : 5,836,500
DATED : November 17, 1998
INVENTOR(S) : Jourde

It is certified that error appears in the above-identified patent and that said Letters Patent is hereby corrected as shown below:

Column 1, line 40, before "length" insert --axial--

Column 1, line 61, delete "extended" and insert --extending-- therefor

Column 1, line 62, delete "said" and insert --the-- therefor

Column 2, line 2, after "example" insert --,-- (comma)

Column 2, line 8, delete "of"

Column 2, line 37, delete "shown" and after "practically" insert --shown--

UNITED STATES PATENT AND TRADEMARK OFFICE
CERTIFICATE OF CORRECTION

PATENT NO. : 5,836,500
DATED : November 17, 1998
INVENTOR(S) : Jourde

It is certified that error appears in the above-identified patent and that said Letters Patent is hereby corrected as shown below:

Column 2, line 40, delete "line" and insert --lines-- therefor

Column 2, line 57, after "flanges" insert --7--

Column 4, line 7, delete "riot" and insert --not-- therefor

Column 4, line 10, delete "flexion" and insert --flexing-- therefor

Column 4, line 41, delete "centring" and insert --centering-- therefor

UNITED STATES PATENT AND TRADEMARK OFFICE
CERTIFICATE OF CORRECTION

PATENT NO. : 5,836,500
DATED : November 17, 1998
INVENTOR(S) : Jourde

It is certified that error appears in the above-identified patent and that said Letters Patent is hereby corrected as shown below:

Column 5, line 27, after "ends of said" insert --at least--

Column 5, line 29, before "successive" delete "at least"

Signed and Sealed this

Twenty-eighth Day of September, 1999

Attest:

Q. TODD DICKINSON

*Attesting Officer*  *Acting Commissioner of Patents and Trademarks*